April 1, 1952  J. B. TURNER, JR  2,591,478
MASS RATE FLOWMETER
Filed June 10, 1948  2 SHEETS—SHEET 1
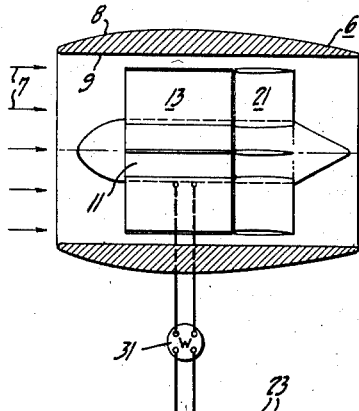
FIG_1_
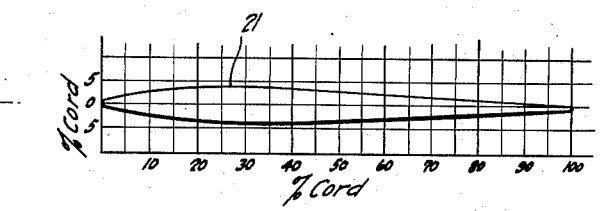
FIG_5_
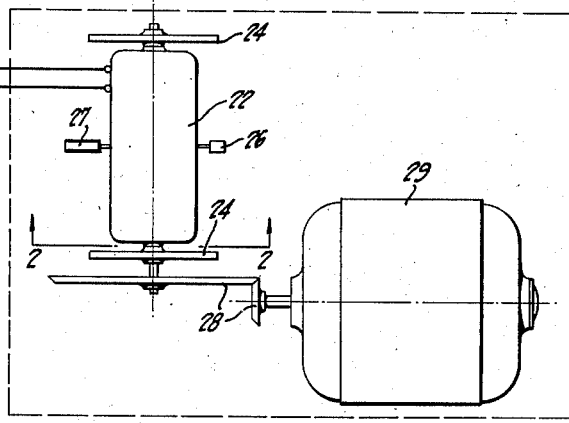
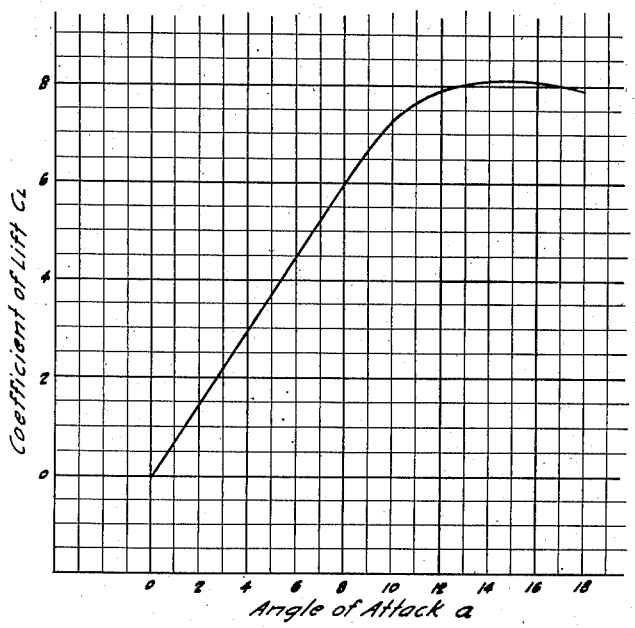
FIG_6_
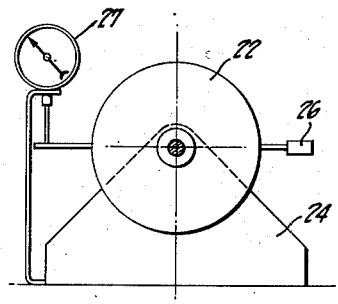
FIG_2_
INVENTOR.
John B. Turner Jr.
BY Manfred F. Warren
his attorney April 1, 1952 J. B. TURNER, JR 2,591,478
MASS RATE FLOWMETER
Filed June 10, 1948 2 SHEETS—SHEET 2
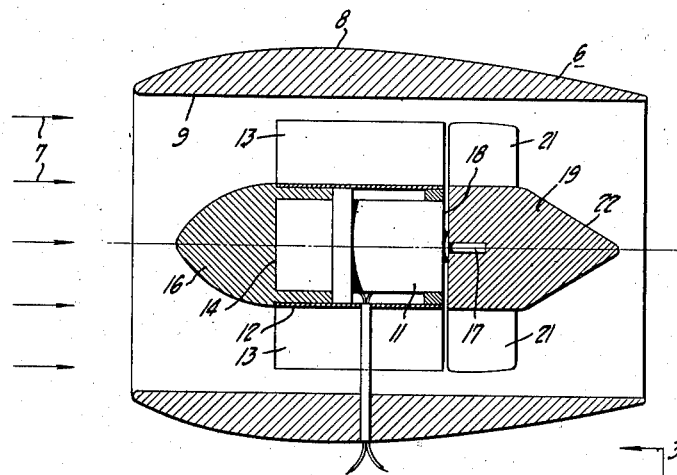
FIG_3_
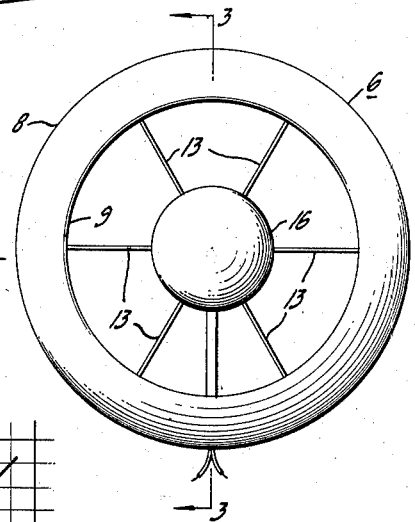
FIG_4_
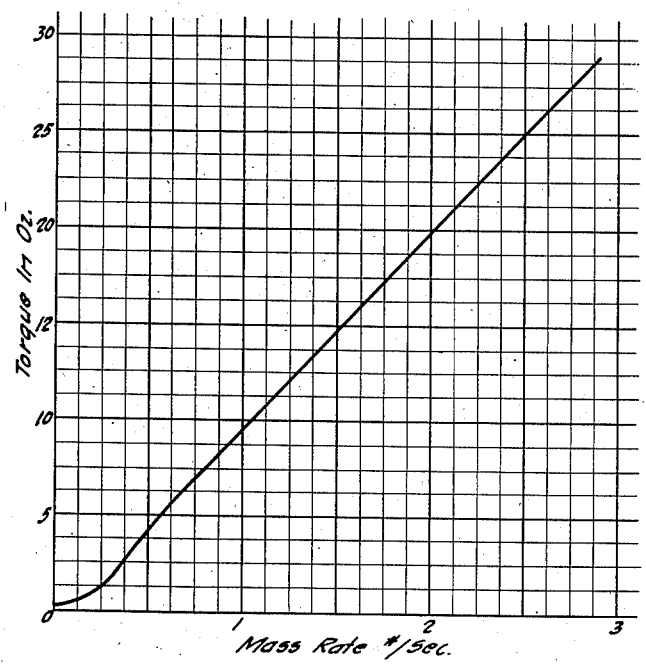
FIG_7_
INVENTOR.
John B. Turner Jr.
BY Manfred M. Warren
his attorney Patented Apr. 1, 1952

2,591,478

UNITED STATES PATENT OFFICE 2,591,478

MASS RATE FLOWMETER

John B. Turner, Jr., Richmond, Calif.

Application June 10, 1948, Serial No. 32,217

4 Claims. (Cl. 73—194)

The invention relates to instruments designed for measuring fluid flow and other fluid characteristics.

As will be understood in dealing with various types and applications of fluid flow involving such variables as velocity, volume, temperature, pressure, altitude, and the like, and in great number of calculations pertaining to carburation and fuel consumption, wind tunnel and other aerodynamic design, etc., it is important to know the mass rate flow of the fluid under consideration. Heretofore, this mass rate has been determined by the use of a plurality of instruments measuring velocity, temperature, pressure and the like, and the use of appropriate tables or formulae for calculations. As will of course be understood mass rate of flow is a function of the velocity, density and area of passage of the fluid, and the density will vary with temperature, pressure, altitude and other considerations. In accordance with the present invention and as the principal object thereof, I provide a device and method for the direct measurement of the mass rate of flow of a fluid without requiring the multiplicity of instruments, measurements and calculations heretofore necessary.

Another object of the invention is to provide a device of the character described which may be readily positioned within a duct or otherwise conveniently located in the fluid stream to be measured and which will directly resolve all of the variables into a direct reading of the mass rate of fluid flow.

Still another object of the invention is to provide a device with the character described which will be composed with a minimum number of sturdily built parts capable of withstanding rigorous applications and use and subjection to high velocity fluid impact.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawing:

Figure 1 is a somewhat diagrammatic view of a fluid mass rate meter constructed in accordance with the present invention.

Figure 2 is a cross-sectional view showing in end elevation a generator-dynamometer unit forming part of the apparatus illustrated in Figure 1, and taken substantially on the plane of line 2—2 of Figure 1.

Figure 3 is a longitudinal cross-sectional view, on a somewhat enlarged scale of the flow meter illustrated in Figure 1, the view being taken substantially on the line 3—3 of Figure 4.

Figure 4 is a front elevation of the flow meter illustrated in Figure 3.

Figure 5 is an outline in graph form of the airfoil used in the device.

Figure 6 is a graph showing the relationship between angle of attack and coefficient lift.

Figure 7 is a graph showing the relationship between mass rate of flow and torque.

The design of the flow meter is based on the principle that the angle of attack of an airfoil, rotating at a constant angular velocity in the fluid stream, decreases with an increase of the velocity of the metered fluid. A direct proportional relationship may be thus established between the angle of attack and the velocity of the fluid. By proper choice of an airfoil section, the coefficient of lift is directly proportional to the angle of attack, within the design range. Since the cross sectional area of the meter is constant, the mass rate is proportional to the product of the density and the velocity. Assuming an angle of attack, the sine and the tangent of which are equal in the design range (less than 10°), and that the velocity relative to the airfoil is equal to the axial velocity, the lift and therefore the torque is independent of the density and only a function of the product of density and velocity. In this manner a directly proportional relationship is established between the torque and the mass rate. This direct relationship will hold true within the design range indicated, that is wherein a minimum mass rate and maximum density will correspond with an angle of attack of 10°.

The foregoing may be expressed and demonstrated algebraically as follows:

Let:
$M$=mass rate of metered fluid.
$A$=cross sectional area of meter.
$V$=velocity of metered fluid.
$d$=density of metered fluid.
$a$=angle of attack.
$W$=angular velocity of airfoil.
$C_L$=coefficient of lift.
$L$=lift.
$S$=area of airfoil.
$T$=torque.
$R$=mean radius of airfoil.
$K_1, K_2, K_3, K_4, K_5, K_6, K_7, K_8, K_9, K_{10}$=constants.

Mass rate of metered fluid will be equaled to the cross sectional area of the meter times the velocity of the fluid times the density, expressed by formula as follows:

1) $$M = AVd$$

Since the cross sectional area of the meter is constant this formula may be expressed:

1a) $$M = VdK_1$$

As above noted the angle of attack of the airfoil is directly proportional to its angular velocity and inversely proportional to the velocity of the metered fluid. This may be expressed:

2) $$a = \frac{W}{V}K_2$$

Since in accordance with the present invention the angular velocity of the airfoil is maintained constant, the formula may be written:

2a) $$a = \frac{K_3}{V}$$

As also described in the foregoing and by proper design, and within the design range, the coefficient of lift is directly proportional to the angle of attack. This may be expressed:

3) $$C_L = K_4 a$$

The lift on the airfoil may be expressed by the following formula:

4) $$L = \frac{C_L S d V^2}{2g}$$

where $g$ is the gravitational constant.

Since the area of the airfoil is a constant this formula may be written:

4a) $$L = C_L dV^2 K_5$$

The torque of the airfoil is equal to the lift times the mean radius, expressed:

5) $$T = LR$$

Since the radius is a constant this formula may be written:

5a) $$T = LK_6$$

By substitution of Formula 4a in 5a:

6) $$T = C_L dV^2 K_7$$

By substitution of Formula 3 in 6:

7) $$T = adV^2 K_8$$

By substitution of Formula 2a in 7:

8) $$T = dVK_9$$

By substitution of Formula 1a in 8:

9) $$T = MK_{10}$$

Thus by means of the foregoing method the mass rate of flow of the fluid may be measured as a direct lineal function of the torque of the airfoil rotated at a constant speed in the fluid stream.

The device illustrated in Figures 1 to 5 of drawings comprises a generally cylindrical enclosure 6 adapted for positioning in a fluid stream, denoted by arrows 7, with the axis of the member 6 parallel to the direction of flow of the fluid. If desired, and as here shown, the exterior periphery 8 of member 6 may be shaped to conform to the N. A. C. A. standard streamline body. The interior wall 9 is preferably cylindrical, that is parallel to the central axis, so as to define a hollow tubular interior.

An electric motor 11 having a cylindrical side wall 12, is mounted axially within the enclosure, and may be conveniently so supported by means of a plurality of radial fins or vanes 13 connecting the motor wall 12 with the interior wall 9 of the enclosure. Fluid flow longitudinally through the enclosure should be irrotational and stable and accordingly the planes of the vanes 13 are arranged parallel to the longitudinal axis of the device. To obtain a smooth acceleration of the fluid over the end of the motor housing and into the vanes, the leading end 14 of the motor housing is preferably fitting with a streamlined nose section 16. The motor shart 17 is extended from the opposite end 18 of the motor and is secured to the hub 19 of one or more blades or airfoils 21 whereby the latter may be rotated in the fluid stream discharged from the vanes. The number of airfoils used is selected in accordance with the amount of torque desired, the greater the number of airfoils the greater the torque. In the present construction 6 airfoils are used. The number of airfoils should however be maintained below the point where interference, lattice effect and other undesirable effects may take place. Preferably, the planes of symmetry of the airfoils are parallel to the axis of rotation, being the longitudinal axis of the device and parallel to the air streams issuing from the vanes. In order to obtain a smooth deceleration of the fluid leaving the meter, the exit end 22 of the hub 19 is preferably also streamlined although the exact shape is not so critical as at the inlet end and I have found that a conical section as here shown will suffice for most purposes.

The particular cross-sectional shape of the airfoil while not critical should be of symmetrical form and have a lineal relationship between the angle of attack and the coefficient of lift. For this purpose an N. A. C. A. M–1 airfoil, illustrated in Figure 5, is entirely satisfactory. The relationship between the coefficient of lift and angle of attack of such an airfoil is illustrated in Figure 6, from which the aforesaid lineal relation over an angle of attack up to about 10° may be observed. Airfoil contours may be used to extend this range. However, the N. A. C. A. M–1 airfoil more closely approaches a flat plate and is easier to build. Actually, a flat plate airfoil may be used over a more limited design range. The important criterion insofar as the present invention is concerned is the selection of an airfoil having zero lift under the influence of the flow of fluid being metered when the airfoil is not rotationally driven in the fluid. This condition is satisfied by the use of an airfoil positioned with its plane of symmetry parallel to and containing the axis of rotation and parallel to the flow of fluid to be measured. In such case there is a zero angle of attack and a zero pitch of the airfoil so that the airfoil tends to remain at rest regardless of the velocity of the incoming fluid.

The criterion may also be satisfied by the use of a non-symmetrical airfoil—e. g. a conventional lift airfoil so oriented as to satisfy the conditions explained above, i. e. having no turning torque under the influence of the incoming fluid. Actually the complexity of building and setting a non-symmetrical airfoil makes the use of such a non-symmetrical airfoil less attractive.

The torque of the airfoil may be measured in a number of ways, two of which are illustrated in Figure 1. With reference to this figure, the motor 11 is a Selsyn motor driven by a Selsyn generator 22 connected thereto by electrical conductors 23, whereby the speed of rotation and the torque of the two units will be the same. The generator 22 is mounted in a cradle 24, balanced by a counter-weight 26, and connected to a weighing scale 27 so that the torque exerted by the unit may be readily measured. The generator is here shown driven through speed reducing gears 28 by a constant speed motor 29. The use of the Selsyn motor and generator units and the cradle and scale dynamometer mounting of the generator unit, permits a convenient remote measuring of the torque of the airfoil in the fluid stream. A second method for measuring the torque of the airfoil is by means of a wattmeter 31 inserted in the line 23 leading to the motor 11. For most applications, the combination of a synchronous motor for driving the airfoil at a desired constant speed, and a wattmeter for measuring the torque or power exerted, will probably be the most convenient arrangement. In such case the wattmeter may be calibrated directly in terms of mass rate of flow of the fluid being measured.

The invention may be further described by reference and description of a specific application for measuring the mass rate of flow of air in the carburetor line or other fuel supply line of an internal combustion engine such as used in aircraft. Assume that the diameter of the duct through which the measured air passes is six inches. This would conveniently be the inside dimension of the enclosure 6 as measured across the internal diameter of wall 9 and in such case the duct would form the enclosure for the meter. An airfoil diameter would be selected approximately equal to the internal diameter or approximately six inches less clearance. Assuming that the minimum air velocity through the duct as required by the engine at idling speed and as measured at the airfoils, would be approximately 50 feet per second, the angular rotation of the airfoil, for a 10° angle of attack would be approximately 330 R. P. M. 6 blades or airfoils may be used as above described and illustrated in the drawing. At sea level and under standard conditions the mass rate of air passing through the duct would be approximately 0.617 pound per second. By either computation using the formula as has been hereinabove set forth or by measurement it will be found that the corresponding torque is 6.12 inch ounces. As the engine calls for more air, the velocity of the air passing through the duct will increase with a corresponding reduction in the angle of attack as has been hereinabove described. Also as will be understood as the altitude of the airplane increases, the density of the air decreases with a corresponding requirement for greater velocity of flow to maintain a given mass rate of flow. At a mass rate of 1 pound per second, regardless of the density or velocity at which this mass rate is attained, the torque will be approximately 9.98 inch ounces. As has been hereinabove described, a direct lineal relationship is attained between the mass rate of the metered fluid and the torque of the airfoil throughout the design range of the instrument, and more particularly throughout the lineal proportional range of angle of attack and the coefficient lift as above discussed.

A calibration curve showing the direct lineal relation between mass rate in pounds per second and torque in inch ounces is illustrated in Figure 7 from which the values above discussed may be read. In the application mentioned the airfoil is rotated at a constant angular velocity at approximately 330 R. P. M. This may be conveniently accomplished by a synchronous motor. The torque of the airfoil may then be obtained from a wattmeter inserted in the power line to the motor or read from a strain gauge mounted on the motor drive shaft. Where a wattmeter is used, it is of course necessary to convert the power read on the wattmeter to torque, adjusting for power losses, motor efficiency, and the like. With such an adjustment the wattmeter may then be calibrated directly in terms of mass rate of flow. Where cumulative mass rate figures are desired, a watt hour meter may be used which will then show the total mass of fluid metered in a given period of time.

It will be understood that the instrument of the present invention may be used to measure mass rate of flow of substantially any fluid, including gas or liquid, compressible or incompressible. In the class of incompressible liquids there may be a variation in density occasioned by change of temperature and other factors which makes a direct reading instrument of the present invention desirable. Also while the instrument has been described in connection with its insertion in a duct it will be understood that the instrument is equally applicable in installations where the meter is entirely in the open and where the diameter of the airfoil is very much smaller than the passage diameter of the fluid to be measured.

I claim:

1. A mass rate flow meter comprising, a tubular member adapted for positioning in a fluid stream to be measured with the axis of said member generally parallel to the direction of flow of said stream so as to conduct at least a part of said stream through said member, a constant speed motor having a substantially cylindrical case mounted concentrically within said member to define a substantially uniform annular passage for said fluid between said case and member and having an axially extending drive shaft, a symmetrical airfoil mounted on said shaft for rotation therewith and with its plane of symmetry parallel to said axis and substantially parallel to the direction of flow of said stream and with said airfoil oriented to zero lift when not rotated in said stream, said motor being adapted to drive said airfoil at a constant angular velocity predetermined relative to the velocity of said stream that the coefficient of lift of said airfoil will be directly proportional to the angle of attack throughout the range of mass rate variation of said stream to be measured, and means for measuring the torque required to rotate said airfoil in said fluid stream.

2. A mass rate flow meter comprising, a tubular member having a substantially cylindrical interior wall adapted for positioning in a fluid stream to be measured with the axis of said member generally parallel to the direction of flow of said stream so as to conduct at least a part of said stream longitudinally through the interior of said member, an electric motor having a substantially cylindrical case and an axially extending drive shaft, a plurality of vanes extending radially from said case and secured to said wall for mounting said motor concentrically within said wall and defining a plurality of longitudinal passages between said case and wall, the planes of said vanes being generally parallel to said axis so as to guide said fluid flow axially through said passages, a symmetrical airfoil mounted on said shaft for rotation therewith and with its plane of symmetry parallel to said axis and substantially parallel to the direction of flow of said stream and with said airfoil oriented to zero lift when not rotated in said stream, said motor being adapted to drive said airfoil at a constant angular velocity predetermined relative to the velocity of said stream that the coefficient of lift of said airfoil will be directly proportional to the angle of attack throughout the range of mass rate variation of said stream to be measured, and means for measuring the torque required to rotate said airfoil in said fluid stream.

3. A mass rate flow meter comprising, a symmetrical airfoil mounted for rotation with its plane of symmetry parallel to its axis of rotation and adapted for positioning in a fluid stream to be measured with said axis generally parallel to the direction of flow of said stream whereby said airfoil has zero lift when not being rotated in said stream, an electric motor connected to said airfoil for driving the latter at a constant angular velocity predetermined relative to the velocity of said stream that the angle of attack of said airfoil throughout the range of fluid flow to be measured will be within the limits of direct proportionality of the coefficient of lift and angle of attack and means measuring the power input to said motor.

4. A cumulative mass flow meter comprising, a symmetrical airfoil mounted for rotation with its plane of symmetry parallel to its axis of rotation and substantially parallel to the direction of flow of said stream and with said airfoil oriented to zero lift when not rotated in said stream, an electric motor connected to said airfoil for driving the latter at a constant angular velocity predetermined relative to the velocity of said stream that the angle of attack of said airfoil throughout the range of fluid flow to be measured will be within the limits of direct proportionality of the coefficient of lift and angle of attack, and a watt hour meter connected to said motor for measuring the cumulative power input to said motor.

JOHN B. TURNER, Jr.

REFERENCES CITED

The following references are of record in the file of this patent:

UNITED STATES PATENTS

| Number | Name | Date |
|---|---|---|
| 720,188 | Seidener | Feb. 10, 1903 |
| 1,550,124 | Thompson | Aug. 18, 1925 |
| 2,472,609 | Moore | June 7, 1949 |